(12) United States Patent
Warren et al.

(10) Patent No.: US 11,560,780 B2
(45) Date of Patent: Jan. 24, 2023

(54) MARKING THE START OF A WELLBORE FLUSH VOLUME

(71) Applicant: HALLIBURTON ENERGY SERVICES, INC., Houston, TX (US)

(72) Inventors: Wesley John Warren, Marlow, OK (US); Donald Anthony Belcher, Duncan, OK (US); Chad Adam Fisher, Cache, OK (US); Bryan Chapman Lucas, Duncan, OK (US); Calvin Lynn Stegemoeller, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 1354 days.

(21) Appl. No.: 15/918,591

(22) Filed: Mar. 12, 2018

(65) Prior Publication Data

US 2019/0277129 A1    Sep. 12, 2019

(51) Int. Cl.
| | | |
|---|---|---|
| *E21B 43/267* | (2006.01) | |
| *E21B 47/00* | (2012.01) | |
| *G01N 11/02* | (2006.01) | |
| *B01F 23/50* | (2022.01) | |
| *B01F 35/22* | (2022.01) | |
| *G01N 11/00* | (2006.01) | |
| *B01F 101/49* | (2022.01) | |

(52) U.S. Cl.
CPC ........... *E21B 43/267* (2013.01); *B01F 23/50* (2022.01); *B01F 35/2202* (2022.01); *E21B 47/00* (2013.01); *G01N 11/02* (2013.01); *B01F 2101/49* (2022.01); *G01N 2011/0053* (2013.01)

(58) Field of Classification Search
None
See application file for complete search history.

(56) References Cited

U.S. PATENT DOCUMENTS

| | | | |
|---|---|---|---|
| 8,177,411 B2 | 5/2012 | Borgstadt | |
| 9,803,467 B2* | 10/2017 | Tang | ..................... E21B 43/267 |
| 2014/0008074 A1* | 1/2014 | Nevison | ............... E21B 43/267 |
| | | | 166/308.1 |
| 2016/0273346 A1* | 9/2016 | Tang | ....................... E21B 43/04 |
| 2016/0312595 A1* | 10/2016 | Surjaatmadja | ......... C09K 8/665 |

FOREIGN PATENT DOCUMENTS

| | | |
|---|---|---|
| EP | 0401003 A2 | 12/1990 |
| WO | 2017160268 A1 | 9/2017 |

\* cited by examiner

*Primary Examiner* — Lina M Cordero
(74) *Attorney, Agent, or Firm* — Polsinelli PC

(57) ABSTRACT

Disclosed are systems and methods for detecting the beginning of a flush volume. A blended fluid is output by a fluid blending apparatus and pumped into a wellbore. The blended fluid transitions from a first composition to a second composition. A blending signal comprising time-varying data relating to characteristics of the blending apparatus or measured from sensors associated with the blending apparatus is received. Based on a first portion of the blending signal corresponding to the first composition, a calibration profile is generated. Based on the calibration profile and a second portion of the blending signal corresponding to the second composition, a transition indicator corresponding to a change in the blended fluid from the first composition to the second composition is determined. Based on the transition indicator, a flush signal indicating the beginning of a flush volume being output by the blending apparatus and pumped into the wellbore is generated.

18 Claims, 12 Drawing Sheets

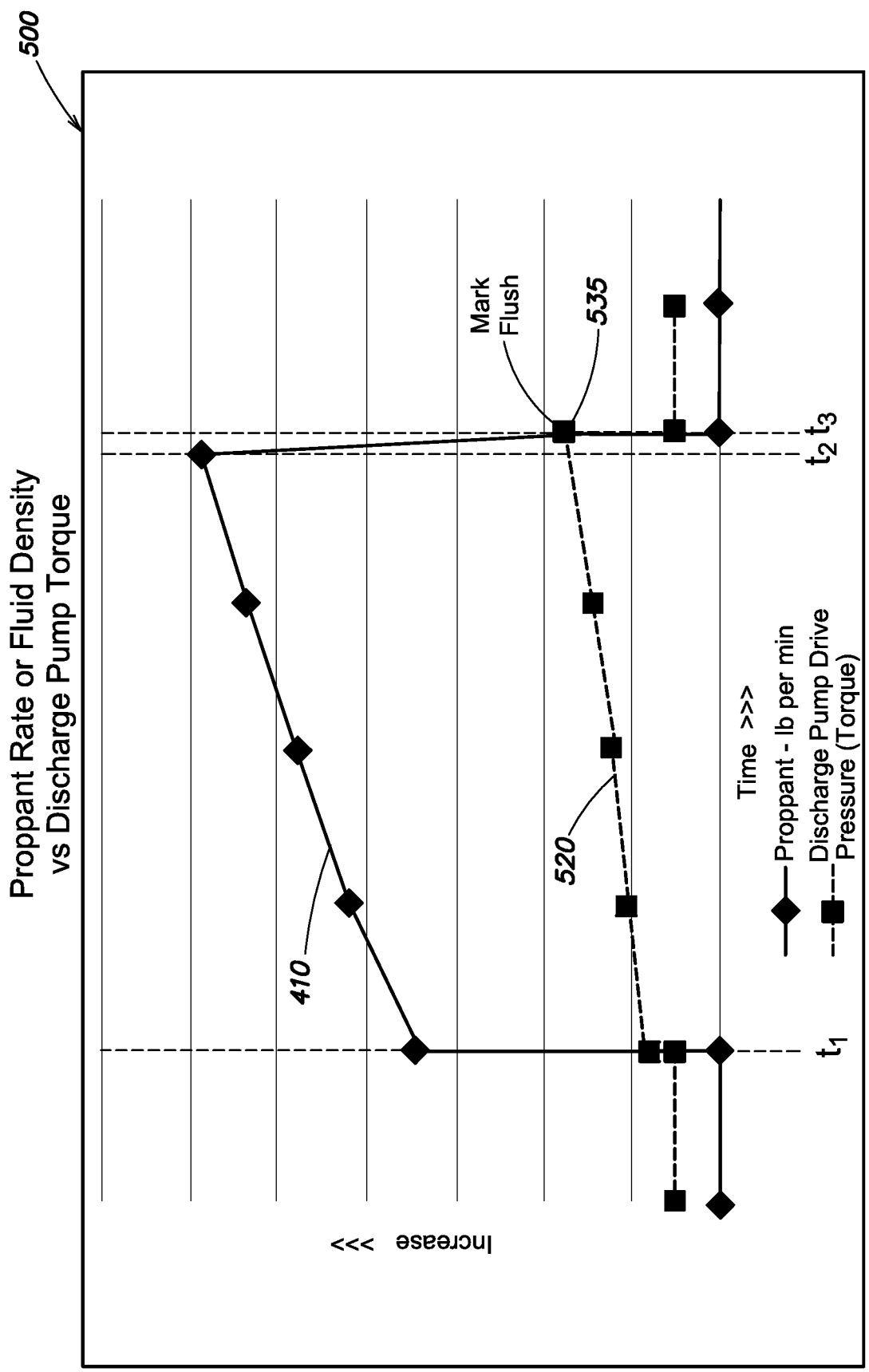

MARKING THE START OF A WELLBORE FLUSH VOLUME

TECHNICAL FIELD

The present technology pertains to fracturing operations, and more specifically to determining when a wellbore flush volume has been initiated.

BACKGROUND

In fracturing operations, one or more perforations are made in a well casing or wellbore surface and into a formation of interest. Through these perforations, fracturing fluid flows into the formation and opens one or more fractures. In order to keep these induced fractures open during and/or following the fracturing treatment, a proppant is also commonly injected into the well. The most common proppant is sand that has been sieved into a desired size for a given fracturing treatment, although other proppants can include sintered bauxite and ceramic proppant. Once a suitable amount of proppant has been injected into the well (but not necessarily into the fractures), a flush stage is initiated to further displace the proppant to a desired depth in the wellbore to ensure that the proppant remains near the perforations and is not overflushed, which can lead to degraded production and/or increased expenditures. The flush stage can be alternatively or additionally initiated in order to clean out the wellbore for an end customer or operator of the wellbore, such that the fractured wellbore is delivered in a clean fluid filled state.

A desired flush volume can be calculated for the flush stage based on various well and fracturing treatment parameters, thereby avoiding any overflushing and related undesired effects. However, for this calculation to be useful, a correct determination must first be made of when the fluid from the downhole blender has transitioned from a proppant laden state to a clean state. Such a process is commonly known as marking flush, i.e. marking the point at which the desired flush volume will be measured from.

Conventional approaches rely upon radioactive densometers (also known as radioactive or nuclear densitometers), which comprise a radioactive source, placed adjacent to the fluid line from the downhole blender, and a detector, calibrated and placed on the other side of the fluid line, opposite the radioactive source. These devices operate on the principle that the density of a fluid is inversely proportional to the count rate of the detector. In the context of initiating a flush stage, as the proppant concentration changes, the detected fluid density will also change, e.g. a lower proppant concentration corresponds to a lower fluid density.

However, these radioactive densometers represent an additional component that must be transported to and installed at a fracturing site, and moreover, require special handling and are subject to various regulatory environments of the jurisdiction(s) in which they are employed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 5 depicts a graph of proppant rate vs. discharge pump torque in accordance with certain embodiments of the present disclosure;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents.

Disclosed herein are systems and methods for determining when a fracturing fluid has transitioned from proppant laden to clean at a downhole blender or other fluid mixing or injection apparatuses. Such a transition marks the beginning of a wellbore flush volume that can be used to ensure that the previously injected proppant is properly dispersed to a desired depth in a wellbore and/or to ensure that the proppant subsequently enters one or more fractures extending from the wellbore and into a formation of interest. The wellbore flush volume can additionally ensure that a well is cleaned out and placed in a clean fluid filled state before being delivered to an end customer or operator. In particular, one or more blending signals can be analyzed in order to construct one or more calibration profiles used in determining a transition indicator corresponding to a change in the blended fluid output of the blender from a first state (e.g. proppant laden) to a second state (e.g. substantially clean). From the transition indicator, one or more operational characteristics of the downhole blender or the fluid flow itself can be controlled.

Figure 1:
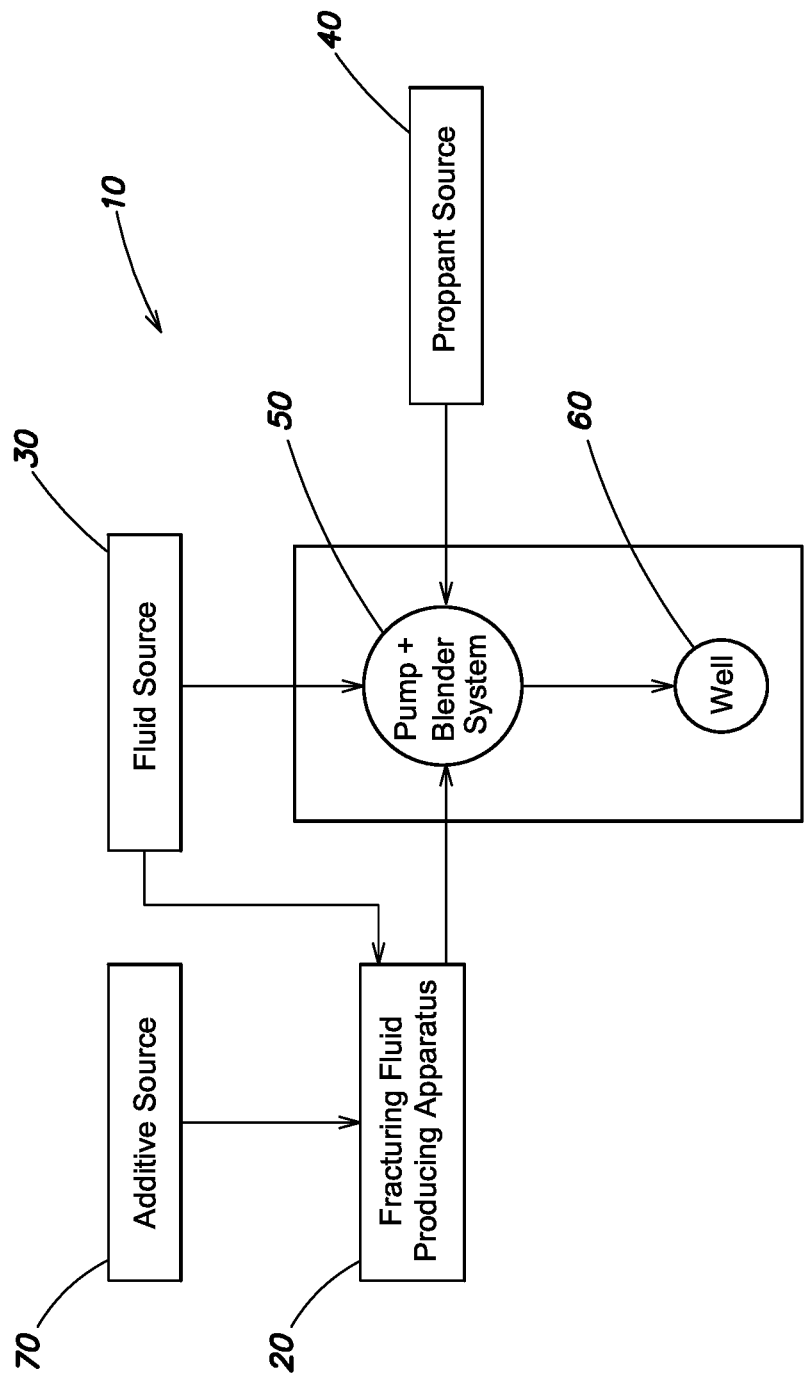
FIG. 1 is a diagram illustrating an example of a fracturing system that may be used in accordance with certain embodiments of the present disclosure

Turning first to FIG. 1, illustrated is a schematic diagram of an exemplary fracturing system 10. As illustrated, fracturing system 10 includes a fracturing fluid producing apparatus 20, a fluid source 30, a proppant source 40, and a pump and blender system 50 and resides at the surface at a well site where a well 60 is located. Pump and blender system 50 can include various sub-components, including a blending apparatus for blending fluid(s) and proppant(s) and further including one or more high-pressure pumping units providing a motive force to transfer blended fracturing fluid from blender system 50 to a desired location, e.g. a downhole wellbore environment. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices can permit pump and blender system 50 to selectively draw raw input fluids and materials from different sources as needed in order to thereby form various desired fracturing fluid compositions using continuous mixing or other 'on-the-fly' preparation methods.

Figure 2:
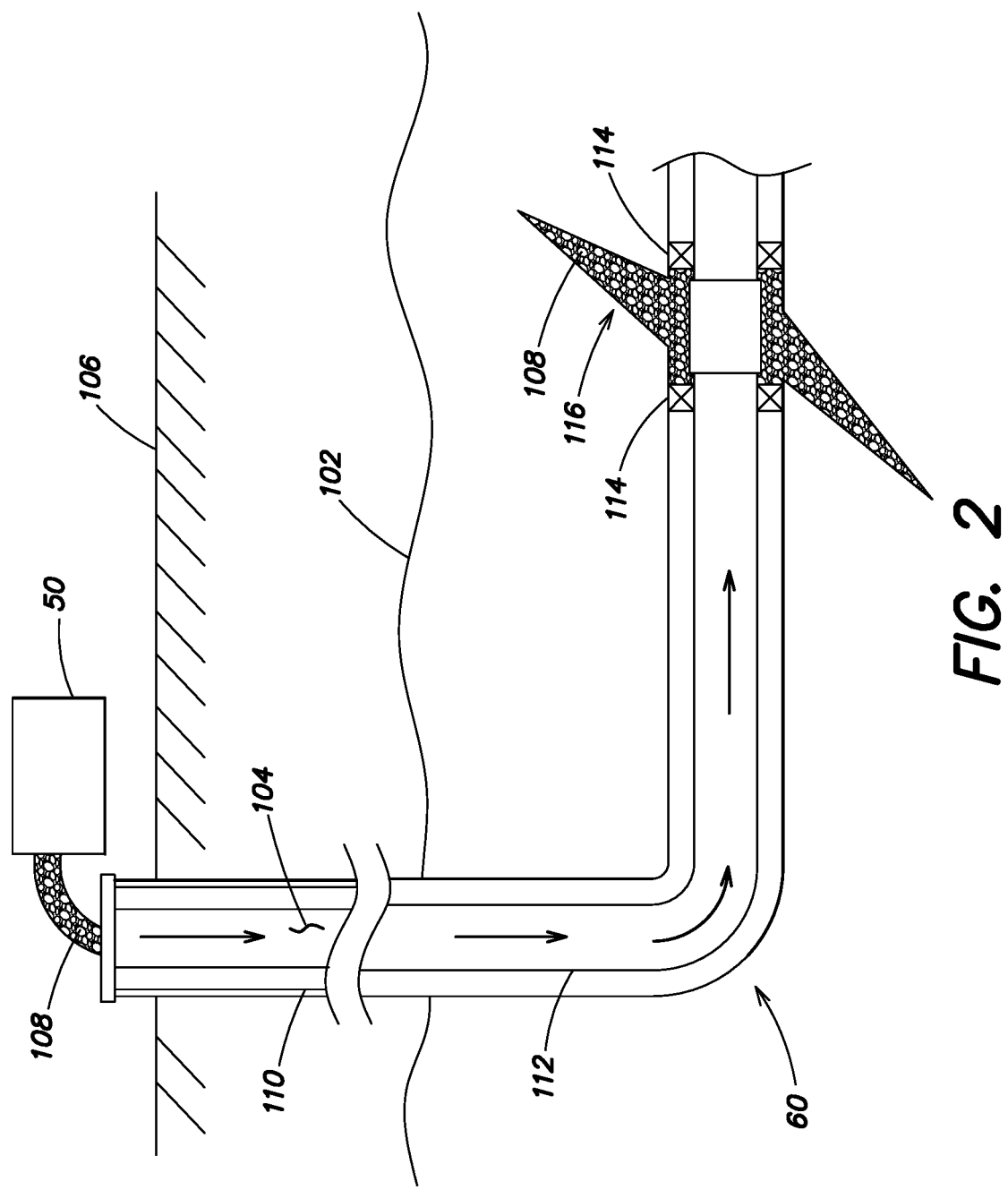
FIG. 2 is a diagram illustrating an example of a subterranean formation in which a fracturing operation may be performed in accordance with certain embodiments of the present disclosure.

FIG. 2 is a schematic diagram showing the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidly move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Disclosed herein is a system and method for determining when a fracturing fluid has transitioned from proppant laden to clean at a downhole blender (e.g. pump and blender system 50 of FIGS. 1 and 2). Such a transition marks the beginning of a wellbore flush volume that is used to ensure that the proppant is properly dispersed into well bore 104 and subsequently enters the fractures 116 as desired and/or is used to ensure that a well is cleaned out and in a clean fluid filled state before delivery to an end customer or operator. As mentioned previously, conventional approaches rely upon a radioactive densometer to indicate the transition to clean fluid. In such systems, the radioactive densometer would be disposed along the fluid flow line from pump and blender system 50 to the top of well bore 104. However, radioactive materials involve many regulatory and compliance issues which can make their use burdensome. Radioactive materials incur greater capital costs and maintenance costs as compared to most non-radioactive materials, and in general, introduce additional risk into the HSE (Health, Safety, Environment) risk profiles of the fracturing and production operations. Accordingly, aspects of the present disclosure pertain to systems and methods for detecting and marking the start of a flush volume without the need for using a radioactive densometer or other radioactive source, although such instruments may still be employed in conjunction with the disclosure herein.

Figure 3:
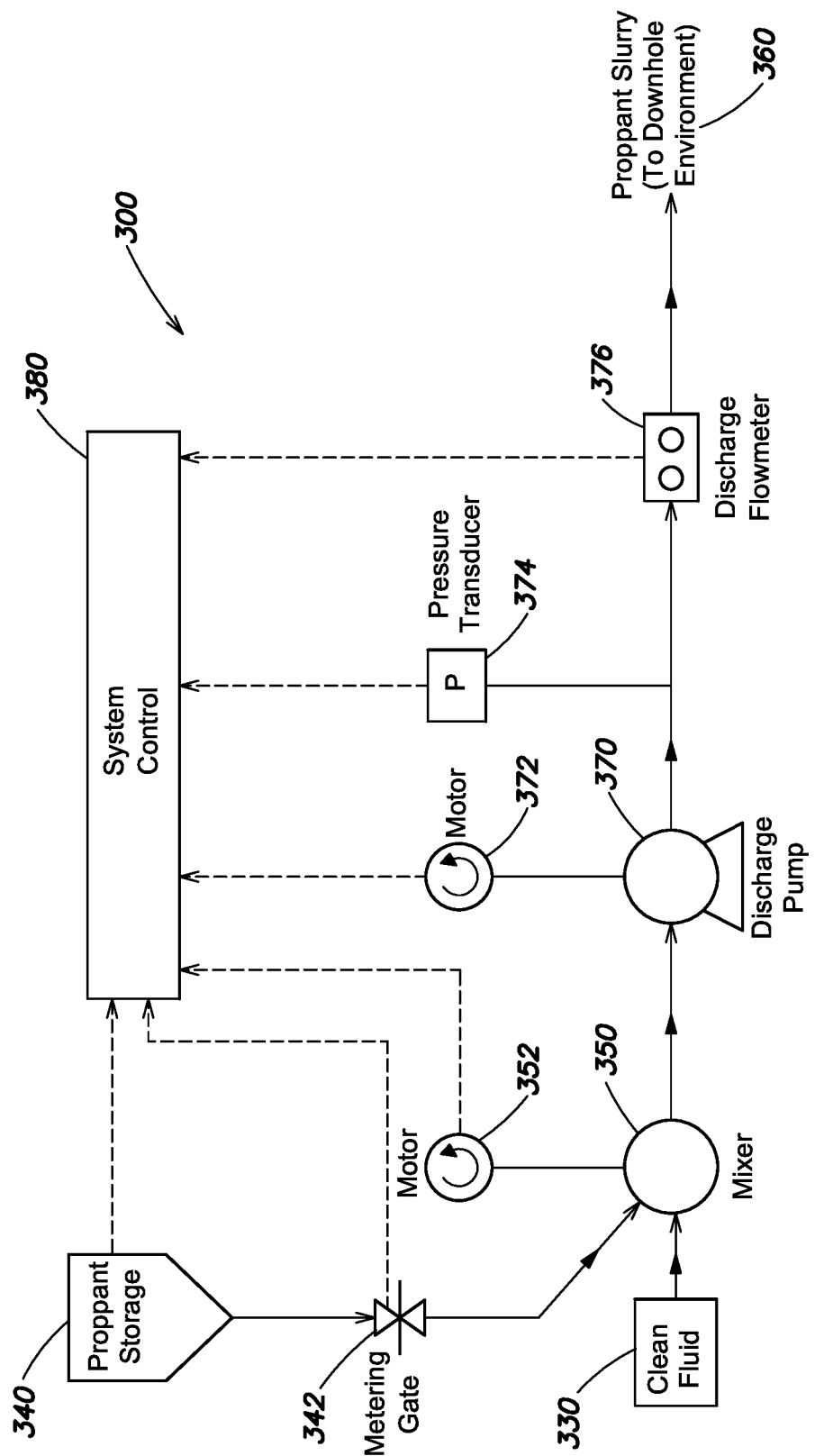
FIG. 3 depicts an example architecture of a system in accordance with certain embodiments of the present disclosure.

FIG. 3 is a schematic diagram illustrating an example system architecture 300 for detecting the initiation of a flush volume according to one embodiment of the present disclosure. In operation, the system represented by architecture 300 might be deployed at the surface of a fracturing operation, e.g. near or at the wellhead or well bore, in a temporary, semi-permanent, or permanent configuration. Similar to the depiction of FIG. 2, architecture 300 includes a fluid source 330, a proppant source 340, a mixer 350, and a discharge pump 370. Collectively, these four components form a blending apparatus 355, also known as a 'blender'. In some embodiments, the blender 355 can be provided as a single, standalone or integrated apparatus. In some embodiments, one or more of these four components might be provided as discrete components and assembled together in order to thereby form blending apparatus 355. For example, fluid source 330 and proppant source 340 might be provided as two separate components, with mixer 350 and discharge pump 370 provided as one integrated component. In another example, mixer 350 may also provide the functionality of discharge pump 370, and vice versa, making only one of the two components needed. In order to form blending apparatus 355, the combined mixer and discharge pump integrated component can be connected to fluid source 330 via a first connection and connected to proppant source 340 via a second connection, although of course various other configurations are possible without departing from the scope of the present disclosure. In some embodiments, an existing blending system which previously employed a radioactive densometer can be retrofit to operate in accordance with the present disclosure and/or the example system architecture 300. For example, the radioactive densometer can be removed, a pipe blank installed in its place, and the control software or control system of the blender apparatus or of the flush operation can be updated or extended to provide the functionality disclosed herein.

A computerized control system 380 is provided to both control and monitor blending operations, as well as to detect the transition from proppant laden fluid to clean fluid within blending apparatus 355 (e.g. between mixer 350 and discharge pump 370), at the output of blending apparatus 355 (e.g. from discharge pump 370), or both. As illustrated, proppant source 340 is connected to mixer 350 via a metering gate 342, which can be actuated (e.g. via control system 380) to vary or otherwise control the amount or rate of proppant discharged from proppant source 340 and into mixer 350. In some embodiments, a screw, auger, or conveyor belt could be employed to provide proppant from proppant source 340 and into mixer 350. An additional metering gate (not shown) can be similarly provided between clean fluid source 330 and mixer 350. When mixer 350 is fed from both fluid source 330 and proppant source 340, a blending motor 352 drives a blending action within mixer 350 to combine the clean fluid and the proppant into a desired fracturing fluid/proppant slurry. The properties of the proppant slurry that is created by mixer 350 can depend upon one or more of the type of proppant used, the amount of proppant used (controlled by metering gate 342), the clean fluid(s) used, the amount of clean fluid used, etc.

From mixer 350, the proppant slurry is output to a discharge pump 370, driven by a discharge motor 372. Discharge pump 370 is responsible for delivering or injecting the proppant slurry to the downhole environment connection point 360, wherein various types and manners of connection may be made to a downhole environment as is needed or desired for a given fracturing operation. Blending motor 352 and/or discharge motor 372 can take the form of an electric, hydraulic, internal combustion, or any other type of motor as would be appreciated by one of ordinary skill in the art.

When mixer 350 is fed from only fluid source 330 (e.g. metering gate 342 is in the fully closed position), blending apparatus 355 will output clean fluid. However, if blending apparatus 355 was previously outputting proppant slurry, some amount of lag will be observed between the moment that metering gate 342 is closed, cutting off the flow of proppant to mixer 350, and the moment that clean fluid is discharged, from either mixer 350 and into discharge pump 370 or from discharge pump 370 into the downhole environment connection point 360. This lag time can be difficult to characterize, as it can depend on a number of factors including the volume of the connection line between metering gate 342 and mixer 350, the dwell time of proppant within mixer 350, the dwell time of proppant slurry between mixer 350 and discharge pump 370, the discharge rate of discharge pump 370, etc. These factors can be highly configuration-specific and are often difficult to directly observe or quantify. While the transition to a clean fluid output is typically associated with a command signal to close metering gate 342, or a received signal that metering gate 342 has closed, such conditions are not always associated with a transition to clean fluid. For example, the proppant supply within proppant source 340 might be exhausted unexpectedly, e.g. due to a leak, loading error, etc. In this case, blending apparatus 355 will begin to output clean fluid instead of a proppant slurry, even though metering gate 342 will remain open.

Accordingly, as seen in architecture 300, computerized control system 380 is communicatively coupled to receive one or more sensor data signals or readings in order to detect the transition from proppant laden fluid to clean fluid and thereby detect or mark the beginning of a flush volume for a given fracturing operation. Computerized control system 380 is communicatively coupled to metering gate 342, blending motor 352, and discharge motor 372. These communicative couplings may be provided in wired fashion, wireless fashion, or some combination of the two, such that computerized control system 380 can both transmit control signals and receive sensor data. In addition to the three components mentioned above, computerized control system 380 is additionally coupled to a discharge pressure transducer 374 and a discharge magnetic/ultrasonic flowmeter 376, the functionality of which will be explained in greater depth below. In some embodiments, a turbine or Coriolis type meter could be employed in conjunction with or in lieu of discharge magnetic/ultrasonic flowmeter 376 for the same purposes of measuring discharge flow. In some embodiments, computerized control system 380 may also be communicatively coupled to proppant source 340, e.g. to a sensor or load cell located in a hopper of the proppant source which outputs sensor data indicative of whether or not proppant is currently present in the hopper.

From one or more of these six illustrated communicative couplings of a sensor channel to computerized control system 380, computerized control system 380 is operative to detect the transition from proppant laden fluid to clean fluid and thereby indicate the beginning of a flush volume or a flush stage. In some embodiments, a measurement or detection window might be triggered at computerized control system 380 in response to an indication that metering gate 342 has gone from an open position to a closed position, an indication that proppant is not currently present in the hopper, or some combination of the two. The use of such triggering and measurement windows can reduce the computational overhead required, as computerized control system 380 will only look for a transition from proppant laden to clean fluid when certain trigger indicators are met, rather than looking constantly. In some embodiments, computerized control system 380 may indeed analyze constantly, employ larger measurement windows, lower triggering thresholds, or implement various other controls such that a more robust and/or frequent analysis of the sensor data stream(s) is performed to look for a transition from proppant laden to clean fluid.

FIGS. 4-10 depict graphs of sensor data measured via one or more of these communicative couplings of sensor data to computerized control system 380. Each graph of FIGS. 4-10 is overlaid with a simulated proppant rate 410, which can be understood to represent the amount of proppant (e.g. in pounds per minute) that is present in the fluid discharged from blending apparatus 355, e.g. either at mixer 350 or at discharge pump 370. Note that the simulated proppant rate 410 is provided for purposes of clarity, and does not represent data that can be measured by a sensor or otherwise received at computerized control system 380. As discussed previously, this proppant rate 410 is opaque during the fracturing operation, which necessitates the use of a radioactive densometer in conventional operations or the use of the system and method of the present disclosure in order to mark the beginning of a flush volume.

It is additionally noted that the various sensor data measured by computerized control system 380 via the illustrated communicative couplings is generally time-varying and therefore associated with one or more sampling rates. In some embodiments, computerized control system 380 can operate upon received sensor data at its native sampling rate, e.g. operating on raw received data. In some embodiments, computerized control system 380 can down-sample or interpolate received sensor data to a lower or higher sampling rate, respectively. For example, computerized control system 380 can be configured to down-sample or interpolate received sensor data to a single common sampling rate. In some embodiments, computerized control system 380 perform one or more pre-processing operations to smooth or otherwise better prepare the received data for the analyses described below, independent of whether any adjustments to sampling rate are performed.

Figure 4:
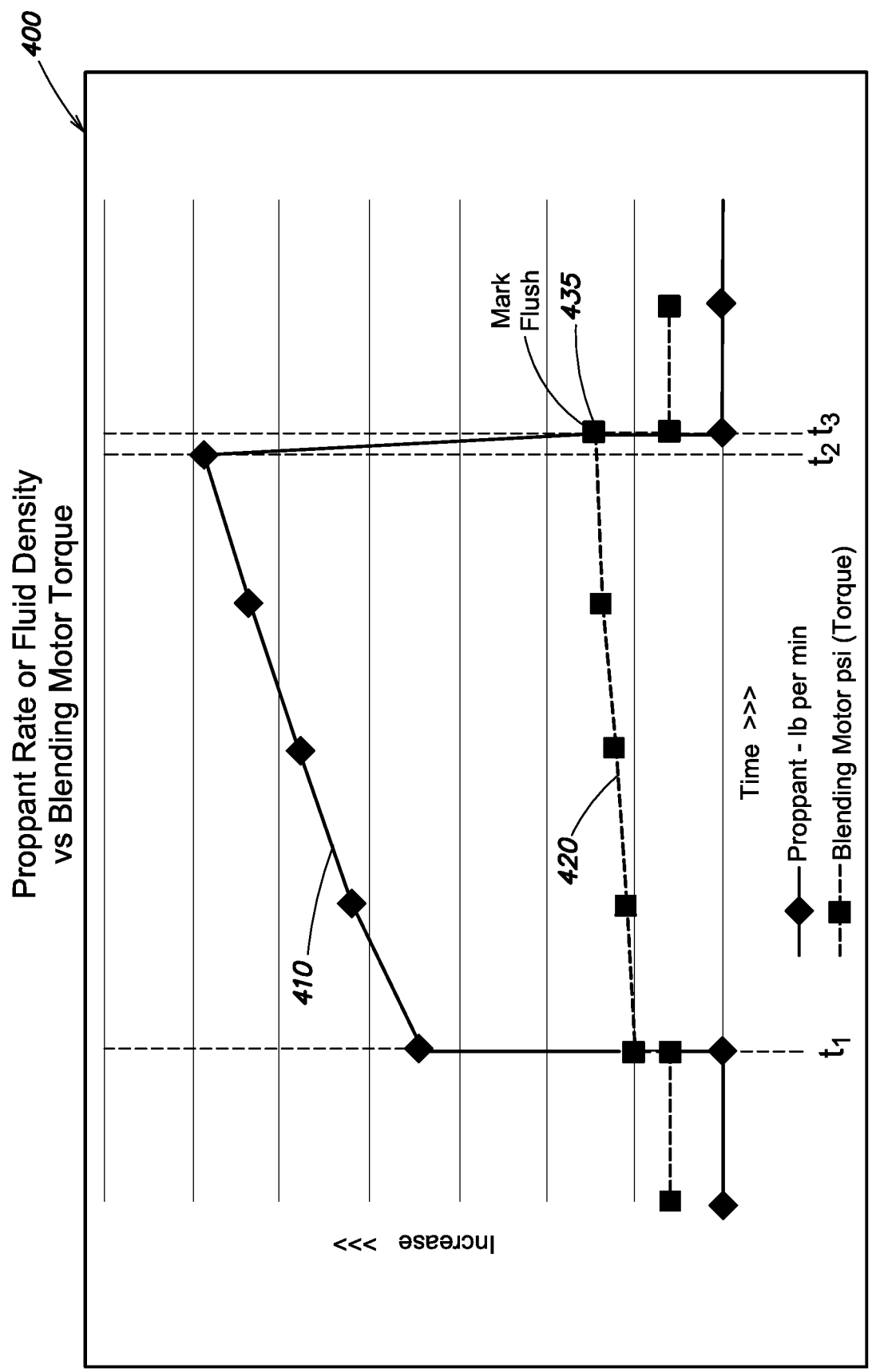
FIG. 4 depicts a graph of proppant rate vs. blending motor torque in accordance with certain embodiments of the present disclosure.

FIG. 4 depicts a graph 400 of proppant rate vs. blending motor torque (e.g. the torque sensed at blending motor 352 of mixer 350), recalling that proppant rate represents the amount of proppant (e.g. in pounds per minute) that is present in the fluid discharged from blending apparatus 355, either at mixer 350 or at discharge pump 370. Blending motor torque is represented by a blending motor torque dataset 420, which can be measured via a torque sensor at blending motor 352. In some embodiments, when blending motor 352 is a hydraulic motor, a hydraulic pressure (e.g. in psi) of blending motor 352 can be measured and subsequently converted to blending motor torque dataset 420, based on one or more known characteristics and properties of mixer 350 and blending motor 352. In embodiments wherein blending motor 352 is an electric motor, its current and/or power draw can be measured and converted to blending motor torque dataset 420, and in embodiments wherein blending motor 352 is an internal combustion engine, its fuel consumption can be measured and converted to blending motor torque dataset 420.

At a time $t_1$, blending apparatus 355 begins to output a mixture of clean fluid and proppant, e.g. the proppant slurry is beginning to be formed. Because the proppant is generally denser than the clean fluid, the addition of proppant to mixer 350 causes the torque applied by blending motor 352 to increase. As seen via blending motor torque dataset 420, this torque continues to increase as the proppant discharge rate of blending apparatus 355 increases.

At some subsequent time $t_2$, the concentration of proppant in the output of blending apparatus 355 begins to decrease, e.g. in response to metering gate 342 being closed to cut off the flow of proppant from proppant source 340 to mixer 350. The concentration of proppant sharply drops off from time $t_2$ to a time $t_3$, at which point the concentration of proppant is substantially zero or otherwise equal to its initial value measured prior to time $t_1$.

Note that the time $t_2$ at which the concentration of proppant in the output of blending apparatus 355 begins to drop does not necessarily correspond to the time at which the blending motor torque begins to drop. Indeed, as seen in blending motor torque dataset 420, the blending motor torque continues to increase for some amount of time after $t_2$. This corresponds to the lag or dwell time(s) present in one or more of mixer 350 and discharge pump 370 of blending apparatus 355, as discussed previously. Eventually, the blending motor torque begins to decrease sharply, as proppant begins to clear from mixer 350, displaced by the flow of clean fluid from fluid source 330. By continuously analyzing the received blending motor torque dataset 420, the computerized control system 380 can mark the beginning of flush volume at a point 435, shown here as occurring at a time between $t_2$ and $t_3$.

However, the rate and specific manner at which this torque will increase, decrease, or otherwise vary can be highly dependent on multiple factors relating to both the specific properties of blending motor 352, the environment in which blending apparatus 355 is deployed, the components that are connected up-stream and down-stream of blending motor 352, and so on. In other words, even given the same environmental inputs, the same fluid inputs, and the same proppant inputs, the point 435 at which the beginning of a flush volume should be marked can vary significantly for different blending apparatuses or even different configurations of a single blending apparatus such as the blending apparatus 355.

Accordingly, it can be desirable to calculate a calibration profile that is specific to blending motor 352 and its current operation in the context of blending apparatus 355 and the overall blending operation. This calibration profile might characterize blending motor 352 when it is blending or outputting a blended fluid with a known composition and behavior (e.g. the period of time up to $t_1$ wherein only clean fluid is being output), might characterize blending motor 352 as it transitions from blending or outputting a blended fluid with a known composition and behavior to blending and outputting a blended fluid with an unknown composition and behavior (e.g. the period of time beginning prior to $t_1$ and ending prior to $t_2$), or both. In either instance, it is contemplated that the calibration profile is calculated from a first portion of the blending motor torque dataset 420, such that some second portion constituting at least the measurements obtained after time $t_2$ remain distinct from the measurements comprising the first portion. In some embodiments, the calibration profile might be stored in advance or calculated separately/independently from the current operation of blending apparatus 355, in which case a suitable calibration profile can be loaded into or from memory at computerized control system 380 for the same purposes as a calibration profile that is calculated in-situ. From this calibration profile, variation in the blending motor 352 and any other components or characteristics of blending apparatus 355 and the environment in which it is deployed, regardless of their source or origin, are accounted and compensated for by computerized control system 380.

In particular, from the calibration profile computerized control system 380 is operable to generate a flush signal indicating the beginning of a flush volume being output by the blending apparatus 355 and pumped into the wellbore. In some embodiments, the determination of the flush point 435 may serve as a suitable transition indicator for the generation of the desired flush signal. However, in some embodiments noise or other error may be introduced to either the signal reading at blending motor 352 and/or during data transmission between blending motor 352 and computerized control system 380, in which case the transition indicator can be provided as a threshold which must first be surpassed before the flush signal is generated and the beginning of the flush volume is marked. This threshold could be absolute (e.g. a drop in torque by a fixed amount) or relative (e.g. a drop in torque by a percentage relative to maximum recorded torque over some previous portion of the torque dataset 420). In some embodiments, the received blending motor torque dataset 420 might be divided into time intervals each including at least two discrete torque measurements, such that each time interval can be characterized as having increasing blending motor torque, decreasing blending motor torque, or constant blending motor torque. In order to mark the beginning of flush volume, a threshold can be set specifying a number of consecutive time intervals that must be of decreasing blending motor torque, or specifying a percentage of consecutive time intervals that must be of decreasing blending motor torque.

Note that when the beginning of flush is marked based on an analysis of blending motor torque dataset 420, this flush mark point 435 corresponds to the time in which no more proppant is present in mixer 350, as at this point blending motor 352 will only be blending clean fluid within mixer 350. In other words, flush mark point 435 may be taken in some embodiments to indicate only that substantially all proppant has passed mixer 350. However, proppant laden fluid may still be present downstream of mixer 350, e.g. in the discharge pump 370 and/or within the fluid flow line between discharge pump 370 and the downhole environment connection point 360. Accordingly, computerized control system 380 may associate a flag or indicator with the marked flush point 435 indicating that it was derived based on an analysis of mixer 350 and/or blending motor 352.

FIG. 5 depicts a graph 500 of proppant rate vs. discharge torque (e.g. the torque sensed at discharge motor 372 of discharge pump 370). Discharge torque is represented by a discharge torque dataset 520, which can be measured via a torque sensor at discharge motor 372. As was the case with blending motor torque dataset 420, the discharge torque dataset 520 can be derived from a hydraulic pressure, an electric current/power draw, or a fuel consumption measurement in instances wherein the discharge motor 372 is provided as a hydraulic motor, an electric motor, and an internal combustion engine, respectively. In some embodiments, the discharge process pressure can be measured downstream from discharge pump 370 via the discharge pressure transducer 374. The discharge process pressure can be used to derive a torque value or can be analyzed as a standalone input value, wherein discharge process pressure will drop when the process fluid transitions from proppant-laden to clean, assuming that the discharge motor 372 is not driven to provide a constant pressure output.

Similar to graph 400 of FIG. 4, graph 500 is overlaid with simulated proppant rate 410 for purposes of clarity and explanation, and in general, much of the same description provided above with respect to the blending pump torque dataset 420 of graph 400 is equally applicable to the discharge torque dataset 520 of graph 500. For example, both torque datasets 420 and 520 begin to increase at or after time $t_1$, continue to increase after time $t_2$, and have in general substantially stabilized by time $t_3$. In some embodiments, the same logic used to detect and mark flush point 435 can also be utilized to detect and mark flush point 535. However, in some embodiments, different logic might be employed to detect and mark flush point 535. For example, flush point 535 can be marked substantially concurrent with time $t_3$ (as illustrated in graph 500) or can be marked at some point after time $t_3$, e.g. after some threshold has been exceeded such that computerized control system 380 can determine with a high probability that discharge pump 370 has been flushed of proppant laden fluid. As was the case with flush mark point 435, flush mark point 535 may be taken in some embodiments to indicate only that substantially all proppant has passed discharge pump 370. However, proppant laden fluid may still be present downstream of discharge pump 370, e.g. in the flow line connecting discharge pump 370 to the downhole environment connection point 360. Accordingly, computerized control system 380 may associate a flag or indicator with the marked flush point 535 indicating that it was derived based on an analysis of discharge pump 370 and/or discharge motor 372.

Figure 6A:
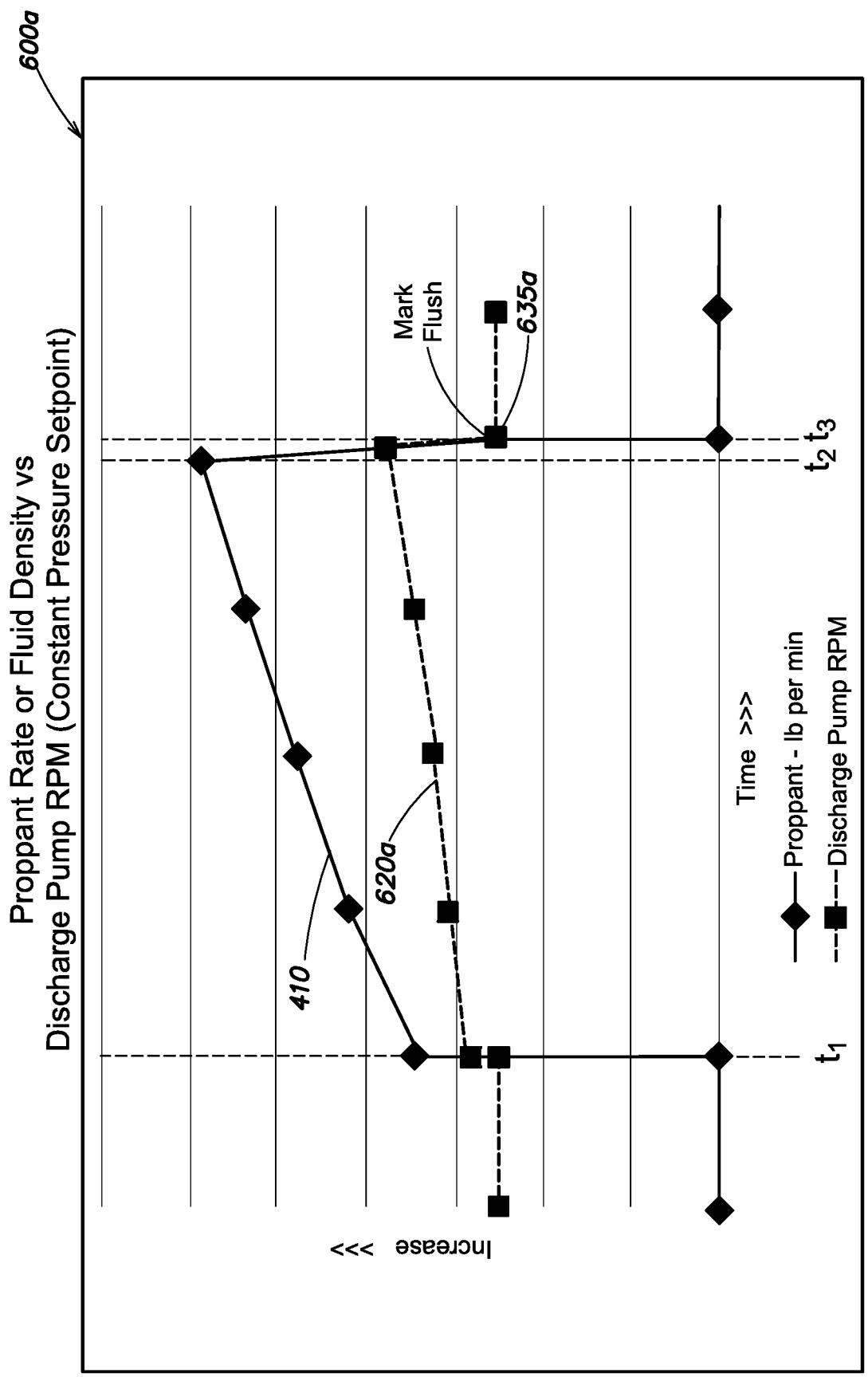
FIG. 6A depicts a graph of proppant rate vs. discharge pump RPM for a constant pressure setpoint with entrained air within the discharge pump fluid, in accordance with certain embodiments of the present disclosure.

FIG. 6A depicts a graph 600a of proppant rate vs. discharge pump speed (e.g. the rotations per minute sensed at discharge motor 372). In the context of graph 600a, it is contemplated that there is entrained air within the discharge or process fluid that is moved by discharge motor 372, e.g. due to the air surrounding the proppant particles when they are introduced into mixer 350. (Note that FIG. 6B and graph 600b depict a scenario in which there is not any entrained air within the discharge fluid). In graph 600a, the discharge pump speed, i.e. RPM, is represented by a discharge pump RPM dataset 620a which can be measured directly from the shaft of discharge motor 372 or a coupled sensor to encode shaft speed. In some embodiments, the discharge pump RPM can be derived from other sensor data based on known parameters and characteristics of at least the discharge motor 372. Although similar to graph 500, graph 600a is directed to certain scenarios wherein discharge motor 372 is configured to maintain a constant discharge pressure from discharge pump 370. Because of the entrained air within the discharge fluid moved through discharge pump 370 by discharge motor 372, the efficiency of the pump will fall off as the proppant concentration increases between $t_1$ and $t_2$. Due to this efficiency drop of discharge pump 370, its RPM will increase in order to maintain the constant discharge pressure setpoint. Once the proppant and entrained air pass through discharge pump 370, its efficiency will increase and its RPM will decrease (e.g. between $t_2$ and $t_3$) in order to maintain the same constant pressure setpoint. Once this stabilization has occurred (subject to one or more of the thresholding methods discussed above with respect to graphs 400 and 500), then the flush point 635a is marked by the computerized control system 380.

Figure 6B:
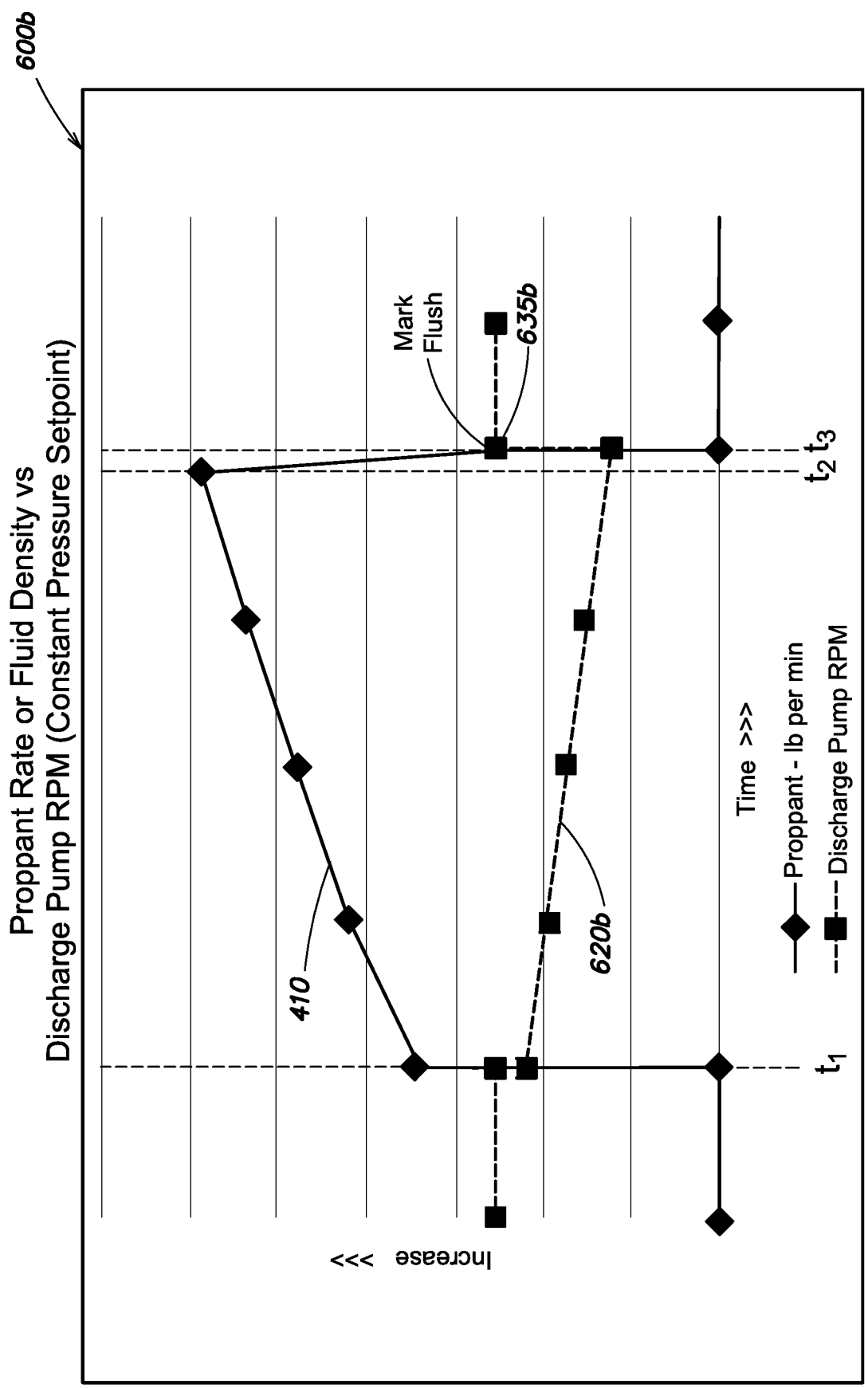
FIG. 6B depicts a graph of proppant rate vs. discharge pump RPM for a constant pressure setpoint without entrained air within the discharge pump fluid, in accordance with certain embodiments of the present disclosure.

As mentioned above, FIG. 6B depicts a graph 600b of proppant rate vs. discharge pump speed in a scenario wherein there is no entrained air within the discharge fluid that is moved through discharge pump 370 by discharge motor 372. In particular, a discharge pump RPM dataset 620b is shown. Notably, whereas FIG. 6A depicted the discharge pump RPM decreasing as proppant concentration decreased, FIG. 6B depicts the discharge pump RPM increasing as proppant concentration decreases. Because the discharge fluid is free of entrained air, the discharge pump efficiency does not change as the proppant concentration changes. Therefore, in order to maintain a constant discharge pressure, the RPM of discharge pump 370 must increase in order to compensate for the decrease in the specific gravity of the discharge fluid caused by decreasing proppant concentration. In other words, absent any entrained air within the discharge fluid, as proppant concentration decreases, the RPM of discharge pump 370 will increase until stabilizing at some higher value. Once this stabilization has occurred (subject to one or more of the thresholding methods discussed above with respect to graphs 400 and 500) then the flush point 635b is marked by the computerized control system 380.

Figure 7:
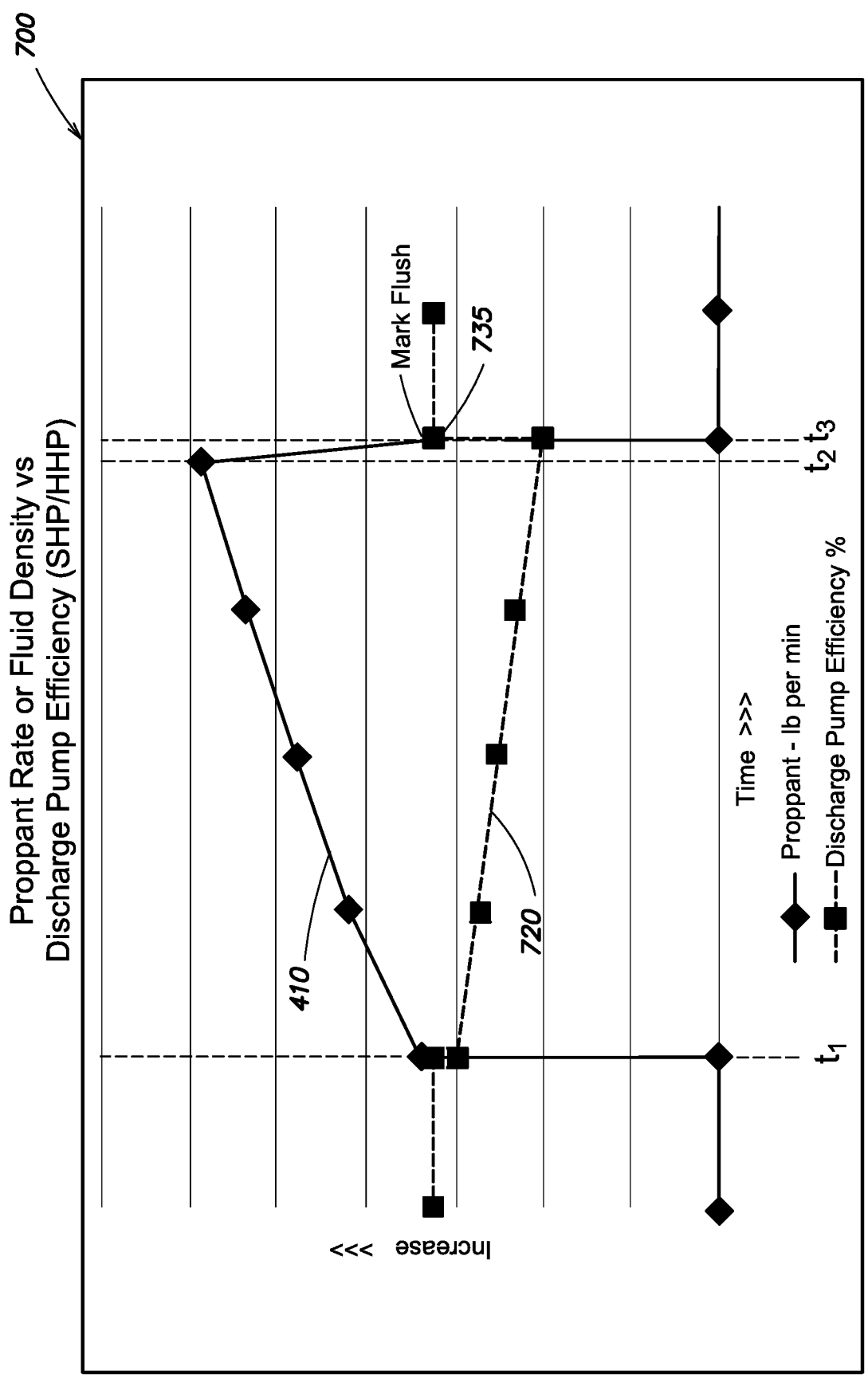
FIG. 7 depicts a graph of proppant rate vs. discharge pump efficiency in accordance with certain embodiments of the present disclosure.

FIG. 7 depicts a graph 700 of proppant rate vs. discharge pump efficiency. Discharge pump efficiency, represented by discharge efficiency dataset 720, is calculated as the ratio of the shaft horsepower (SHP) at discharge motor 372 to the hydraulic horsepower (HHP) at discharge pump 370. The HHP can be calculated by multiplying the flowrate measured by discharge flowmeter 376 with the pressure measured by pressure transducer 374, as both of these components are downstream of discharge pump 370 Based on the observation that the efficiency of discharge motor 372 increases when pumping clean fluid rather than proppant-laden fluid, a flush point 735 can be detected and marked by computerized control system 380, subject to one or more of the thresholding methods discussed previously). As seen in discharge efficiency dataset 720, the efficiency of discharge motor 372 decreases as the concentration of proppant in the proppant slurry increases, such that the rapid increase in efficiency following a prolonged period of decreased indicates that proppant has cleared discharge pump 370 and the flush point can be marked. In some embodiments, one or more of the SHP and the HHP can be calculated directly by computerized control system 380, or can be calculated by a sensor integrated with discharge motor 372 and/or discharge pump 370 such that computerized control system 380 receives an already computed SHP value, HHP value, or an efficiency value.

Figure 8:
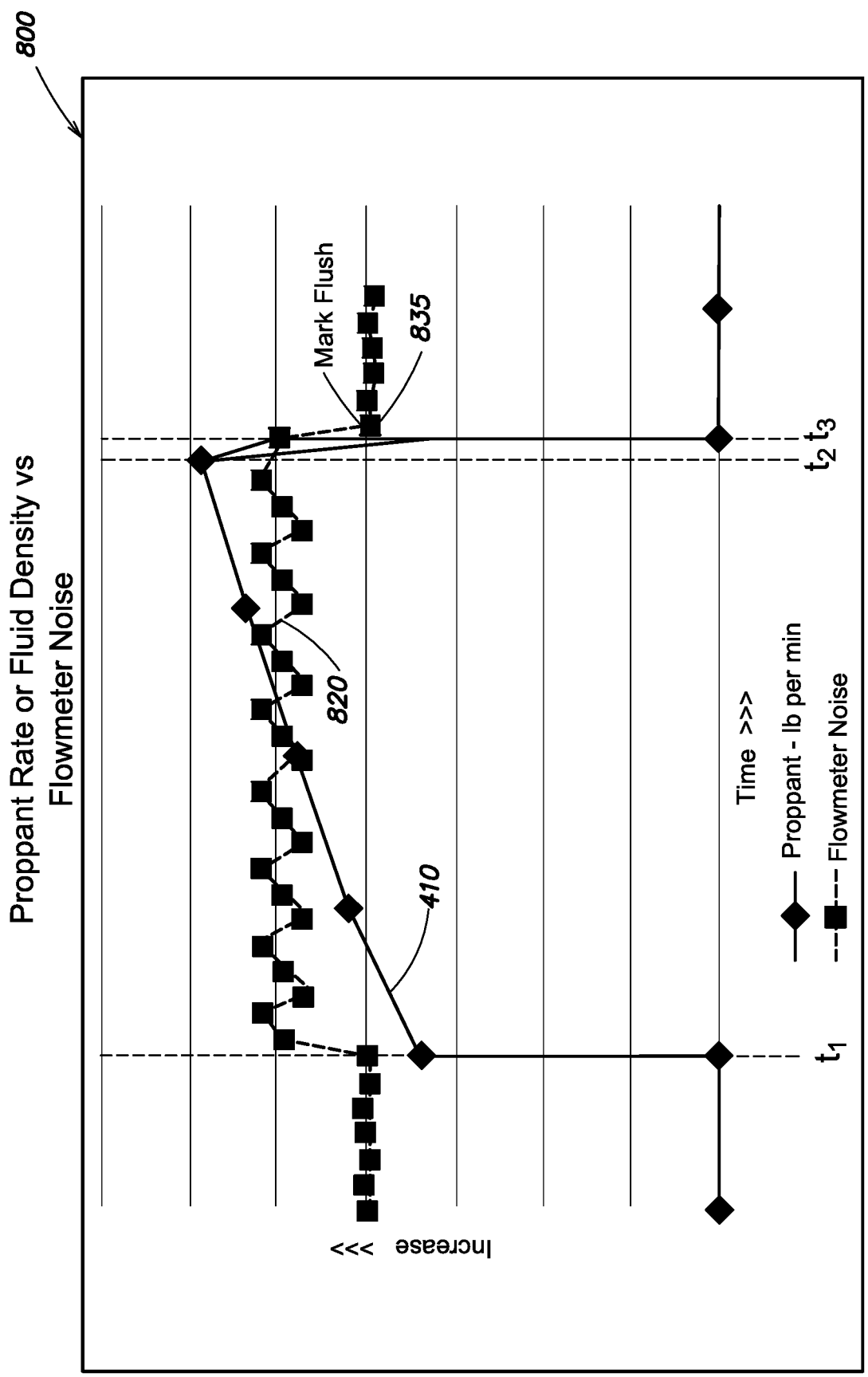
FIG. 8 depicts a graph of proppant rate vs. flowmeter noise in accordance with certain embodiments of the present disclosure.

FIG. 8 depicts a graph 800 of proppant rate vs. flowmeter noise (e.g. the noise present in the sensor data measured by the discharge flowmeter 376 and/or the sensor data received by computerized control system 380 from discharge flowmeter 376). Based on the observation that the presence of proppant in a fluid flow causes increased noise in the flowmeter signal (whether a magnetic or ultrasonic flowmeter is employed as discharge flowmeter 376), a flush point 835 can be detected and marked by computerized control system 380. The flowmeter noise is represented by a flowmeter noise dataset 820, which can be calculated as the noise present in raw data measured by the discharge flowmeter 376 itself (e.g. a magnetic or ultrasonic flowmeter, or a turbine or Coriolis type meter), the noise present in the raw data received at computerized control system 380 from discharge flowmeter 376, or some combination of the two. In other words, unlike previously discussed measurement signals and data, the flowmeter noise dataset 820 comprises derived data rather than raw measured data. In some embodiments, the discharge flowmeter 376 may perform in-situ noise suppression, in which case flowmeter noise dataset 820 must be reconstructed or measured with an additional sensor. In some embodiments, the discharge flowmeter 376 may perform in-situ noise suppression and make available the suppressed noise component as a diagnostic output, in which case the flowmeter noise dataset 820 could be a raw received input at computerized control system 380.

Regardless of how it is obtained or derived, the flowmeter noise dataset 820 can be analyzed by computerized control system 380 to detect the point at which the flowmeter noise decreases back to a threshold value, such as a threshold value corresponding to the noise level on discharge flowmeter 376 prior to time $t_1$, when the discharge fluid was clean and not proppant-laden. In other embodiments, computerized control system 380 might detect the point at which the flowmeter noise has decreased by a threshold amount, which may be a fixed value or a value taken relative to a maximum noise value over some previous portion of flowmeter noise dataset 820. This marked flush point 835 can be taken to indicate that all, or substantially all, of the proppant present in blending apparatus 355 has passed the discharge flowmeter 376. As seen in the architecture 300 of FIG. 3, the discharge flowmeter 376 is the final illustrated component prior to the downhole environment connection point 360, meaning that the point at which flush point 835 is marked should fall after the previously discussed flush points, as flush point 835 represents the final flush point present in architecture 300.

In some embodiments, noise in the discharge process pressure measured by discharge pressure transducer 374 can replace the flowmeter noise dataset 820, such that computerized control system 380 detects and marks a flush point based on a similar analysis of the discharge process pressure noise. When the amplitude of the noise variations present in the discharge process pressure data drops below a threshold value, this indicates that all, or substantially all, of the proppant has passed discharge pump 370 and the discharge pressure transducer 374.

The analysis and detection of flush points presented above with respect to FIGS. 4-8 focused only on the mixer 350 and downstream components (e.g. discharge pump 370 and discharge flowmeter 376). In some embodiments, these may be the only flush points detected and marked by computerized control system 380, as these are the flush points that are calculated from the actual mixture that is present within or output by the overall blending apparatus. However, as illustrated in architecture 300 of FIG. 3, some embodiments may calculate flush points upstream from mixer 350, i.e. based on one or more sensor measurements from the proppant source 340.

Figure 9:
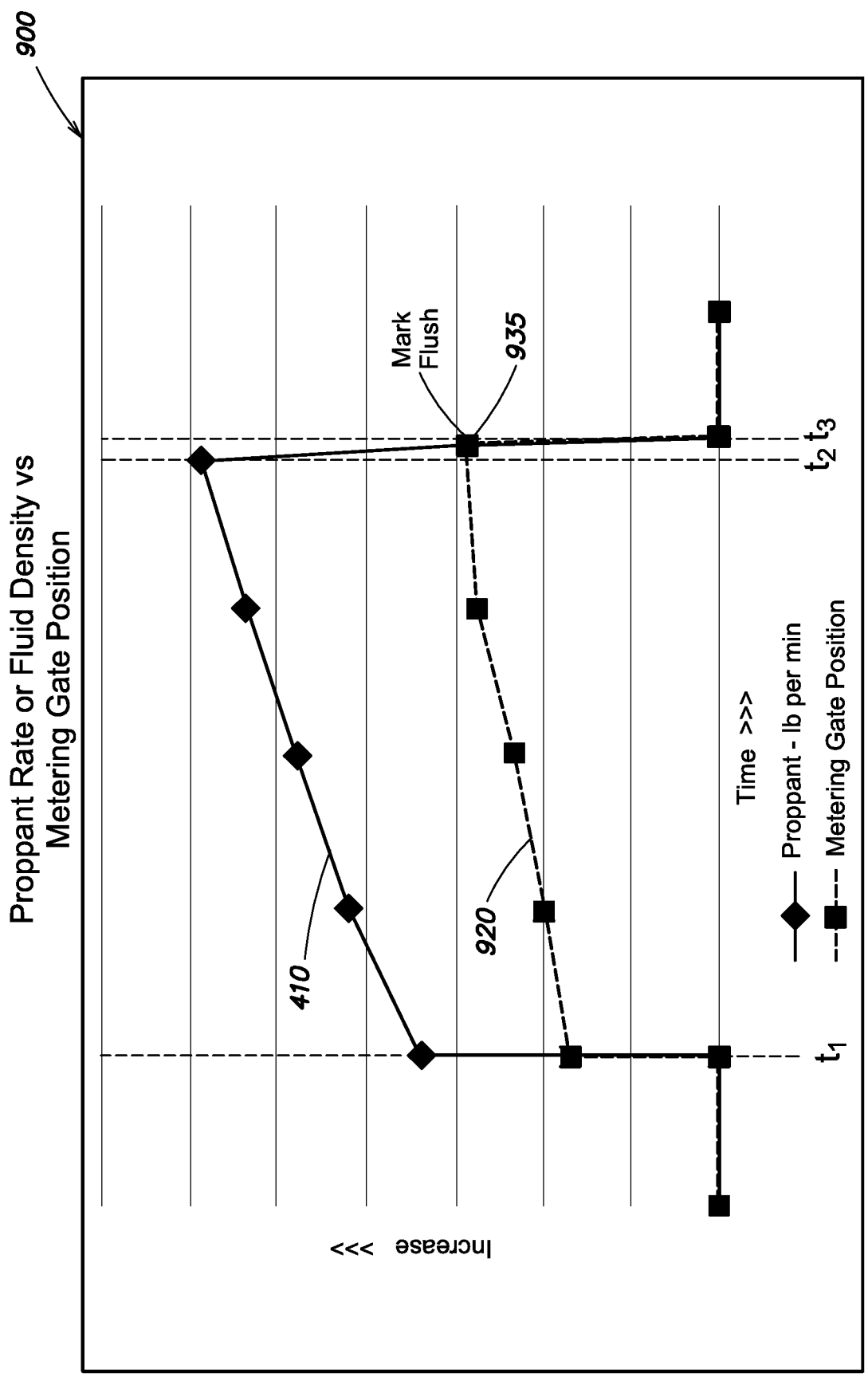
FIG. 9 depicts a graph of proppant rate vs. metering gate position in accordance with certain embodiments of the present disclosure.

For example, FIG. 9 depicts a graph 900 of proppant rate vs. metering gate position, wherein a metering gate position dataset 920 is derived from a sensor or transducer signal received by computerized control system 380 to represent the position or state of the metering gate 342 which controls the flow of proppant from proppant source 340 to the mixer 350. The value of the metering gate position dataset 920 prior to time $t_1$ represents the closed state of metering gate 342, whereas the increasing value of the metering gate position dataset 920 between times $t_1$ and $t_2$ represents the increasingly open state of metering gate 342. Note that here, flush point 935 is marked once the position of metering gate 342 begins to rapidly decrease, as detected on the basis of exceeding either a threshold amount or a threshold percentage relative to a maximum open position of metering gate 342. This threshold can be calculated based on the observation that an operational adjustment of metering gate 342 occurs more slowly than a state change adjustment. For example, the operational adjustment rate of metering gate 342 between times $t_1$ and $t_2$ is far slower than the state change adjustment of metering gate 342 which begins between times $t_2$ and $t_3$ in response to a command to fully close the gate and cease proppant flow from proppant source 240.

Figure 10:
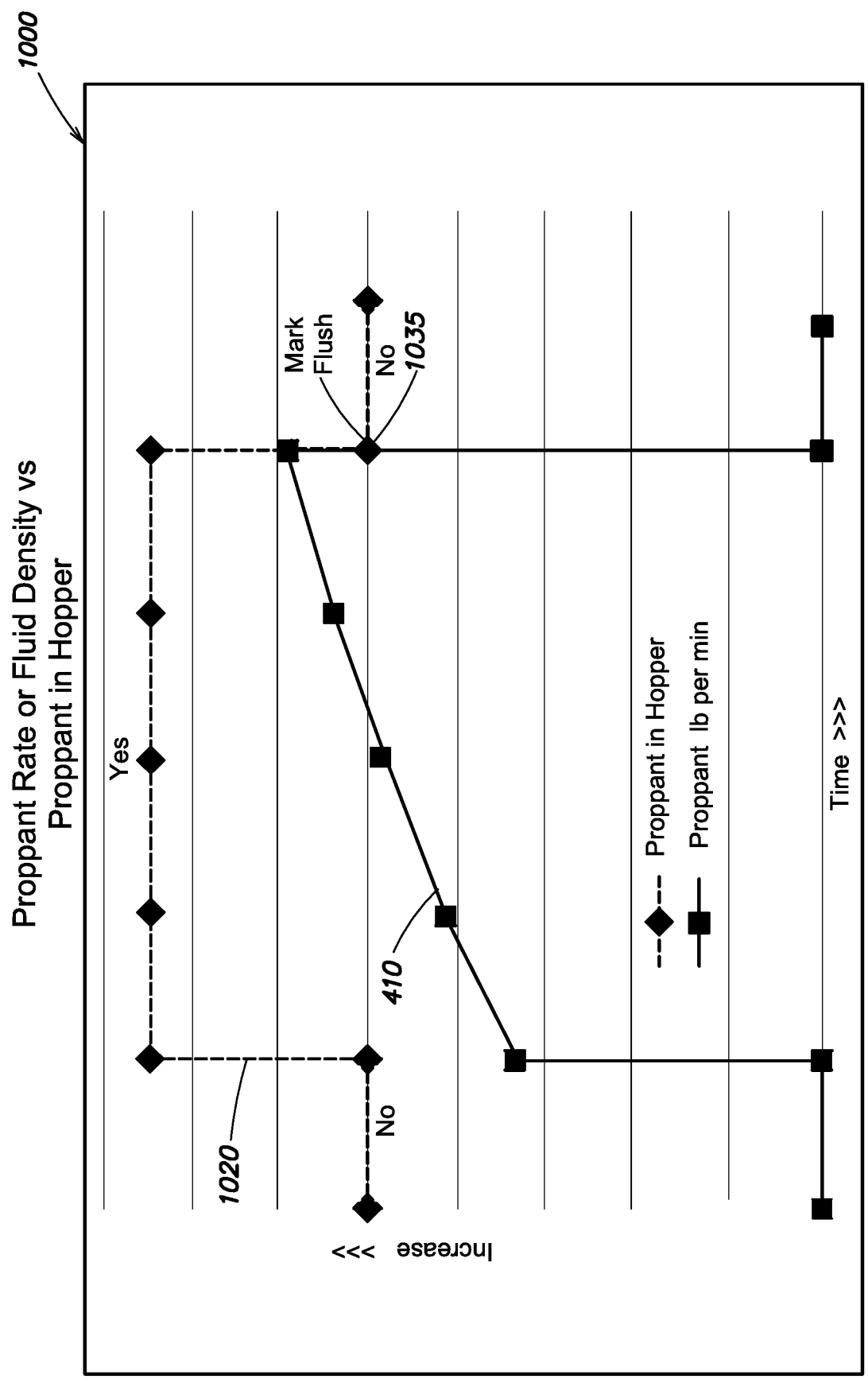
FIG. 10 depicts a graph of proppant rate vs. proppant in hopper in accordance with certain embodiments of the present disclosure.

FIG. 10 depicts a graph 1000 of proppant rate vs. proppant in hopper, wherein a sensor or load cell is used to provide a binary signal 1020 indicative of whether or not proppant is present in the hopper. Although not shown specifically in FIG. 3, such a hopper might be integrated with proppant source 340, e.g. as an intermediate area containing the proppant desired for transmission to mixer 250, integrated with mixer 350 as an intermediate storage area for scenarios in which proppant is received at a rate greater than which mixer 350 can ingest it, or integrated between proppant source 340 and mixer 350 for the same purpose of providing intermediate storage. In general, it is contemplated that the hopper will contain only that proppant which is desired for mixing with clean fluid from fluid source 330 in order to form proppant slurry. As such, when the hopper no longer contains proppant, this is indicative that blending apparatus 355 will soon transition from outputting proppant-laden fluid to outputting clean fluid. Accordingly, a flush point 1035 can be detected and marked when the hopper signal 1020 transitions from the 'YES' state to the 'NO' state. This flush point 1035 would fall prior to any of the flush points discussed above with respect to FIGS. 4-9, all of which are flush points detected and marked downstream of a proppant hopper.

Figure 11:
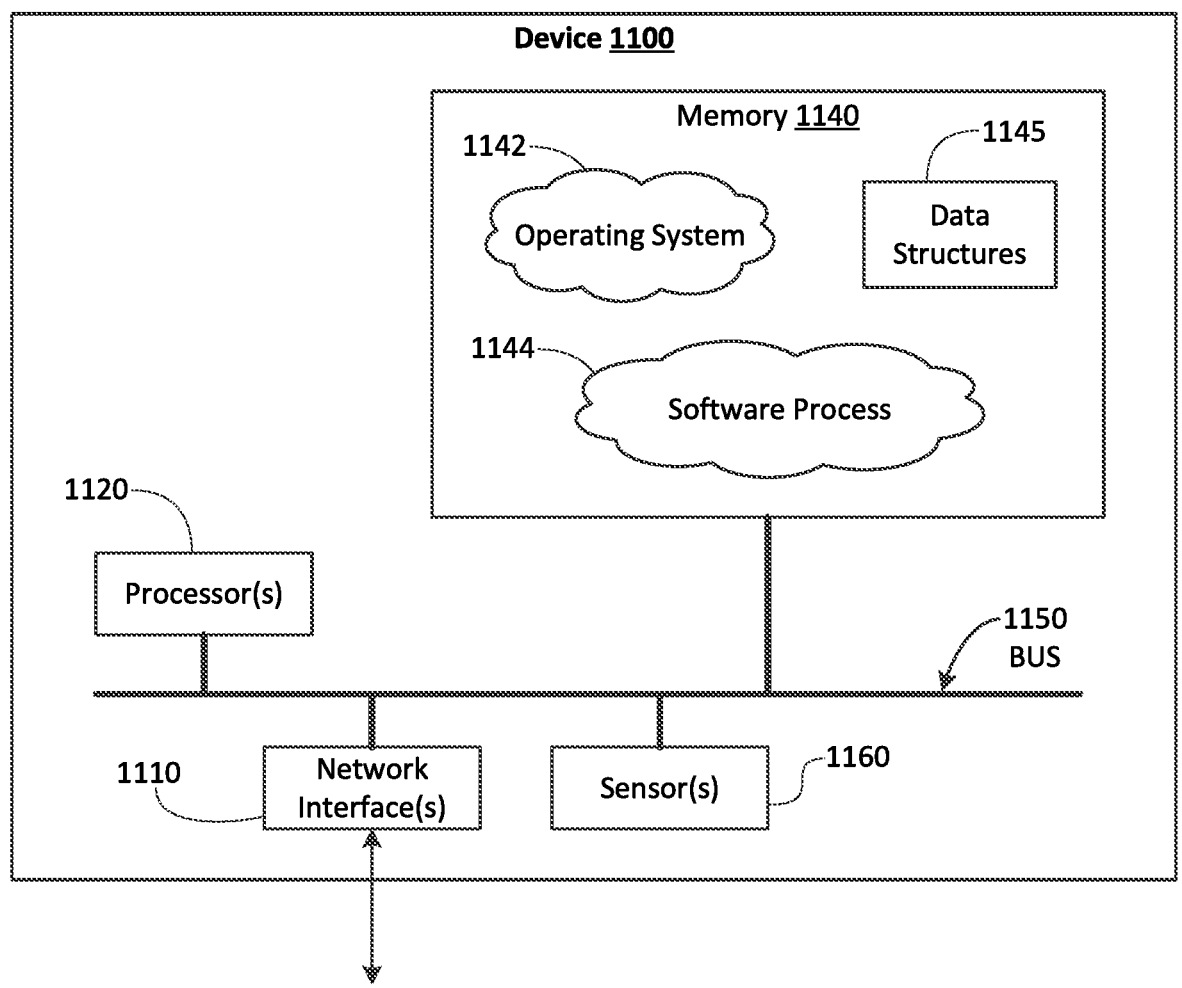
FIG. 11 depicts a block diagram of an exemplary device in accordance with certain embodiments of the present disclosure.

FIG. 11 is a block diagram of an exemplary device 1100. Device 1100 is configured to perform processing of data and communicate with the one or more sensors associated with blending apparatus 355 and/or communicatively coupled with computerized control system 380. As shown, device 1100 includes hardware and software components such as network interfaces 1110, at least one processor 1120, sensors 1160 and a memory 1140 interconnected by a system bus 1150. Network interface(s) 1110 include mechanical, electrical, and signaling circuitry for communicating data over communication links, which may include wired or wireless communication links. Network interfaces 1110 are configured to transmit and/or receive data using a variety of different communication protocols, as will be understood by those skilled in the art.

Processor 1120 represents a digital signal processor (e.g., a microprocessor, a microcontroller, or a fixed-logic processor, etc.) configured to execute instructions or logic to perform tasks in a wellbore environment. Processor 1120 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 1120 typically operates in conjunction with shared or dedicated hardware, including but not limited to, hardware capable of executing software and hardware. For example, processor 1120 may include elements or logic adapted to execute software programs and manipulate data structures 1145, which may reside in memory 1140.

Sensors 1160 typically operate in conjunction with processor 1120 to perform wellbore measurements, and can include special-purpose processors, detectors, transmitters, receivers, and the like. In this fashion, sensors 1160 may include hardware/software for generating, transmitting, receiving, detection, logging, and/or sampling magnetic fields, seismic activity, and/or acoustic waves, or other well parameters.

Memory 1140 comprises a plurality of storage locations that are addressable by processor 1120 for storing software programs and data structures 1145 associated with the embodiments described herein. An operating system 1142, portions of which may be typically resident in memory 1140 and executed by processor 1120, functionally organizes the device by, inter alia, invoking operations in support of software processes and/or services 1144 executing on device 1100. These software processes and/or services 1144 may perform processing of data and communication with device 1100, as described herein. Note that while process/service 1144 is shown in centralized memory 1140, some embodiments provide for these processes/services to be operated in a distributed computing network.

It will be apparent to those skilled in the art that other processor and memory types, including various computer-readable media, may be used to store and execute program instructions pertaining to the borehole evaluation techniques described herein. Also, while the description illustrates various processes, it is expressly contemplated that various processes may be embodied as modules having portions of the process/service 1144 encoded thereon. In this fashion, the program modules may be encoded in one or more tangible (non-transitory) computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic). In general, any process logic may be embodied in processor 1120 or computer readable medium encoded with instructions for execution by processor 1120 that, when executed by the processor, are operable to cause the processor to perform the functions described herein.

The embodiments shown and described above are only examples. Therefore, many details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the present disclosure.

Statements of the Disclosure Include:

Statement 1: A method for detecting the beginning of a flush volume, the method comprising: pumping a blended fluid into a wellbore, wherein the blended fluid is output by a fluid blending apparatus and transitions from a first fluid composition to a second fluid composition; receiving, at a processor, a blending signal comprising a series of time-varying blending data, the time-varying blending data relating to operational characteristics of the fluid blending apparatus; analyzing, based on a calibration profile corresponding to one or more of the first fluid composition and the second fluid composition, a second portion of the blending signal corresponding to the second fluid composition in order to determine a transition indicator, the transition indicator corresponding to a change in the blended fluid from the first fluid composition to the second fluid composition; and generating, based on the transition indicator, a flush signal indicating the beginning of a flush volume being output by the blending apparatus and pumped into the wellbore.

Statement 2: The method of statement 1, wherein the change in the blended fluid from the first fluid composition to the second fluid composition is a predetermined drop in a proppant concentration in the blended fluid.

Statement 3: The method of one or more of statements 1 and 2, wherein the first fluid composition comprises the blended fluid having a stable or increasing concentration of proppant.

Statement 4: The method of one or more of statements 1-3, wherein the second fluid composition comprises the blended fluid having substantially no proppant or having a concentration of proppant that is below a pre-determined proppant concentration threshold.

Statement 5: The method of one or more of statements 1-4, further comprising: calculating a desired flush volume for the wellbore; and terminating, based on the flush signal and the desired flush volume, the output of blended fluid from the blending apparatus such that the volume of blended fluid in the second composition pumped into the wellbore is substantially equal to the desired flush volume.

Statement 6: The method of one or more of statements 1-5, wherein the first portion of the blending signal is measured at an earlier point in time than the second portion of the blending signal.

Statement 7: The method of one or more of statements 1-6, wherein the transition indicator is determined based on an absolute deviation between one or more blending data values of the second portion of the blending signal and: one or more blending data values of the first portion of the blending signal; or the generated calibration profile.

Statement 8: The method of one or more of statements 1-6, wherein the transition indicator is determined based on a relative or percentage deviation between one or more blending data values of the second portion of the blending signal and: one or more blending data values of the first portion of the blending signal; or the generated calibration profile.

Statement 9: The method of one or more of statements 1-8, wherein the time-varying blending data is obtained from one or more of: a flowmeter reading of the blending apparatus; a discharge pressure of the blending apparatus; a rotational speed of a discharge pump of the blending apparatus; a discharge efficiency of the discharge pump; a torque of the discharge pump; a torque of a blending motor of the blending apparatus; a proppant metering gate position of the blending apparatus; and a proppant hopper load cell reading of the blending apparatus.

Statement 10: The method of statement 9, wherein torque is derived from one or more of: a hydraulic pressure, an electric power consumption, and a fuel consumption.

Statement 11: The method of one or more of statements 1-10, wherein the values of the time-varying blending data comprise measurement noise levels or measurement noise amplitudes.

Statement 12: The method of one or more of statements 1-11, further comprising: calculating a plurality of transition indicators from one or more received blending signals; and based on the plurality of transition indicators, generating a composite flush signal indicating a probability that the flush volume is being output by the blending apparatus and pumped into the wellbore.

Statement 13: A system comprising: a fluid blending apparatus having a sensor array providing two or more sensor channels, the sensor array configured to acquire one or more blending signals, each blending signal comprising a series of time-varying blending data corresponding to a blended fluid output by the fluid blending apparatus and pumped into a wellbore such that the blended fluid transitions from a first fluid composition to a second fluid composition; and at least one processor in communication with the fluid blending apparatus, wherein the processor is coupled with a non-transitory computer-readable storage medium having stored therein instructions which, when executed by the at least one processor, cause the at least one processor to, for each blending signal of the one or more blending signals: analyze, based on a calibration profile corresponding to one or more of the first fluid composition and the second fluid composition, a second portion of the blending signal corresponding to the second fluid composition in order to determine a transition indicator, the transition indicator corresponding to a change in the blended fluid from the first fluid composition to the second fluid composition; and generate, based on the transition indicator, a flush signal indicating the beginning of a flush volume being output by the blending apparatus and pumped into the wellbore.

Statement 14: The system of statement 13, wherein the change in the blended fluid from the first fluid composition to the second fluid composition is a predetermined drop in a proppant concentration in the blended fluid.

Statement 15: The system of one or more of statements 13 and 14, wherein: the first fluid composition comprises the blended fluid having a stable or increasing concentration of proppant; and the second fluid composition comprises the blended fluid having substantially no proppant or having a concentration of proppant that is below a pre-determined proppant concentration threshold.

Statement 16: The system of one or more of statements 13-15, wherein the instructions further cause the at least one processor to: calculate a desired flush volume for the wellbore; and terminate, based on the flush signal and the desired flush volume, the output of blended fluid from the blending apparatus such that the volume of blended fluid in the second composition pumped into the wellbore is substantially equal to the desired flush volume.

Statement 17: The system of one or more of statements 13-16, wherein the transition indicator is determined based on a relative or percentage deviation between one or more blending data values of the second portion of the blending signal and: one or more blending data values of the first portion of the blending signal; or the generated calibration profile.

Statement 18: The system of one or more of statements 13-17, wherein the sensor array providing two or more sensor channels communicates time-varying blending data comprising one or more of: a flowmeter reading of the blending apparatus; a discharge pressure of the blending apparatus; a rotational speed of a discharge pump of the blending apparatus; a discharge efficiency of the discharge pump; a torque of the discharge pump; a torque of a blending motor of the blending apparatus; a proppant metering gate position of the blending apparatus; and a proppant hopper load cell reading of the blending apparatus.

Statement 19: The system of one or more of statements 13-18, wherein the values of the time-varying blending data comprise noise levels or noise amplitudes of a measurement obtained by the sensor array.

Statement 20: The system of one or more of statements 13-19, wherein the instructions further cause the at least one processor to: calculate a plurality of transition indicators from one or more received blending signals; and based on the plurality of transition indicators, generate a composite flush signal indicating a probability that the flush volume is being output by the blending apparatus and pumped into the wellbore.

What is claimed is:

1. A method for detecting a beginning of a flush volume, the method comprising:
    pumping a blended fluid into a wellbore, wherein the blended fluid is output by a fluid blending apparatus and transitions from a first fluid composition to a second fluid composition;
    receiving, at a processor, a blending signal comprising a series of time-varying blending data, the time-varying blending data relating to operational characteristics of the fluid blending apparatus;
    analyzing, based on a calibration profile corresponding to one or more of the first fluid composition and the second fluid composition, a second portion of the blending signal corresponding to the second fluid composition in order to determine a transition indicator, the transition indicator corresponding to a change in the blended fluid from the first fluid composition to the second fluid composition;
    generating, based on the transition indicator, a flush signal indicating the beginning of the flush volume being output by the fluid blending apparatus and pumped into the wellbore;
    calculating a desired flush volume for the wellbore; and
    terminating, based on the flush signal and the desired flush volume, the output of blended fluid from the fluid blending apparatus such that a volume of blended fluid in the second fluid composition pumped into the wellbore is substantially equal to the desired flush volume.

2. The method of claim 1, wherein the change in the blended fluid from the first fluid composition to the second fluid composition is a predetermined drop in a proppant concentration in the blended fluid.

3. The method of claim 1, wherein the first fluid composition comprises the blended fluid having a stable or increasing concentration of proppant.

4. The method of claim 3, wherein the second fluid composition comprises the blended fluid having substantially no proppant or having a concentration of proppant that is below a pre-determined proppant concentration threshold.

5. The method of claim 1, wherein a first portion of the blending signal is measured at an earlier point in time than the second portion of the blending signal.

6. The method of claim 1, wherein the transition indicator is determined based on an absolute deviation between one or more blending data values of the second portion of the blending signal and:
    one or more blending data values of a first portion of the blending signal; or
    the calibration profile.

7. The method of claim 1, wherein the transition indicator is determined based on a relative or percentage deviation between one or more blending data values of the second portion of the blending signal and:
    one or more blending data values of a first portion of the blending signal; or
    the calibration profile.

8. The method of claim 1, wherein the time-varying blending data is obtained from one or more of:
    a flowmeter reading of the fluid blending apparatus;
    a discharge pressure of the fluid blending apparatus;
    a rotational speed of a discharge pump of the fluid blending apparatus;
    a discharge efficiency of the discharge pump;
    a torque of the discharge pump;
    a torque of a blending motor of the fluid blending apparatus;
    a proppant metering gate position of the fluid blending apparatus; and
    a proppant hopper load cell reading of the fluid blending apparatus.

9. The method of claim 8, wherein the torque of the discharge pump or the torque of the blending motor are derived from one or more of: a hydraulic pressure, an electric power consumption, and a fuel consumption.

10. The method of claim 8, wherein values of the time-varying blending data comprise measurement noise levels or measurement noise amplitudes.

11. The method of claim 1, further comprising:
    calculating a plurality of transition indicators from one or more received blending signals; and
    based on the plurality of transition indicators, generating a composite flush signal indicating a probability that the flush volume is being output by the fluid blending apparatus and pumped into the wellbore.

12. A system comprising:
    a fluid blending apparatus having a sensor array providing two or more sensor channels, the sensor array configured to acquire one or more blending signals, each blending signal comprising a series of time-varying blending data corresponding to a blended fluid output by the fluid blending apparatus and pumped into a wellbore such that the blended fluid transitions from a first fluid composition to a second fluid composition; and
    at least one processor in communication with the fluid blending apparatus, wherein the at least one processor is coupled with a non-transitory computer-readable storage medium having stored therein instructions which, when executed by the at least one processor, cause the at least one processor to, for each blending signal of the one or more blending signals:
   analyze, based on a calibration profile corresponding to one or more of the first fluid composition and the second fluid composition, a second portion of the blending signal corresponding to the second fluid composition in order to determine a transition indicator, the transition indicator corresponding to a change in the blended fluid from the first fluid composition to the second fluid composition;
   generate, based on the transition indicator, a flush signal indicating a beginning of a flush volume being output by the fluid blending apparatus and pumped into the wellbore;
   calculate a desired flush volume for the wellbore; and
   terminate, based on the flush signal and the desired flush volume, the output of blended fluid from the fluid blending apparatus such that a volume of blended fluid in the second fluid composition pumped into the wellbore is substantially equal to the desired flush volume.

13. The system of claim 12, wherein the change in the blended fluid from the first fluid composition to the second fluid composition is a predetermined drop in a proppant concentration in the blended fluid.

14. The system of claim 12, wherein:
   the first fluid composition comprises the blended fluid having a stable or increasing concentration of proppant; and
   the second fluid composition comprises the blended fluid having substantially no proppant or having a concentration of proppant that is below a pre-determined proppant concentration threshold.

15. The system of claim 12, wherein the transition indicator is determined based on a relative or percentage deviation between one or more blending data values of the second portion of the blending signal and:
   one or more blending data values of a first portion of the blending signal; or
   the calibration profile.

16. The system of claim 12, wherein the sensor array providing the two or more sensor channels communicates the time-varying blending data comprising one or more of:
   a flowmeter reading of the fluid blending apparatus;
   a discharge pressure of the fluid blending apparatus;
   a rotational speed of a discharge pump of the fluid blending apparatus;
   a discharge efficiency of the discharge pump;
   a torque of the discharge pump;
   a torque of a blending motor of the fluid blending apparatus;
   a proppant metering gate position of the fluid blending apparatus; and
   a proppant hopper load cell reading of the fluid blending apparatus.

17. The system of claim 16, wherein values of the time-varying blending data comprise noise levels or noise amplitudes of a measurement obtained by the sensor array.

18. The system of claim 12, wherein the instructions further cause the at least one processor to:
   calculate a plurality of transition indicators from one or more received blending signals; and
   based on the plurality of transition indicators, generate a composite flush signal indicating a probability that the flush volume is being output by the fluid blending apparatus and pumped into the wellbore.

* * * * *